April 29, 1947. W. F. BORGERD ET AL 2,419,881
SEA WATER FRACTIONATOR
Filed June 2, 1944 2 Sheets-Sheet 1

Inventors:
William F. Borgerd
and John S. Palmer,
By Paul O. Pippel
Attorney.

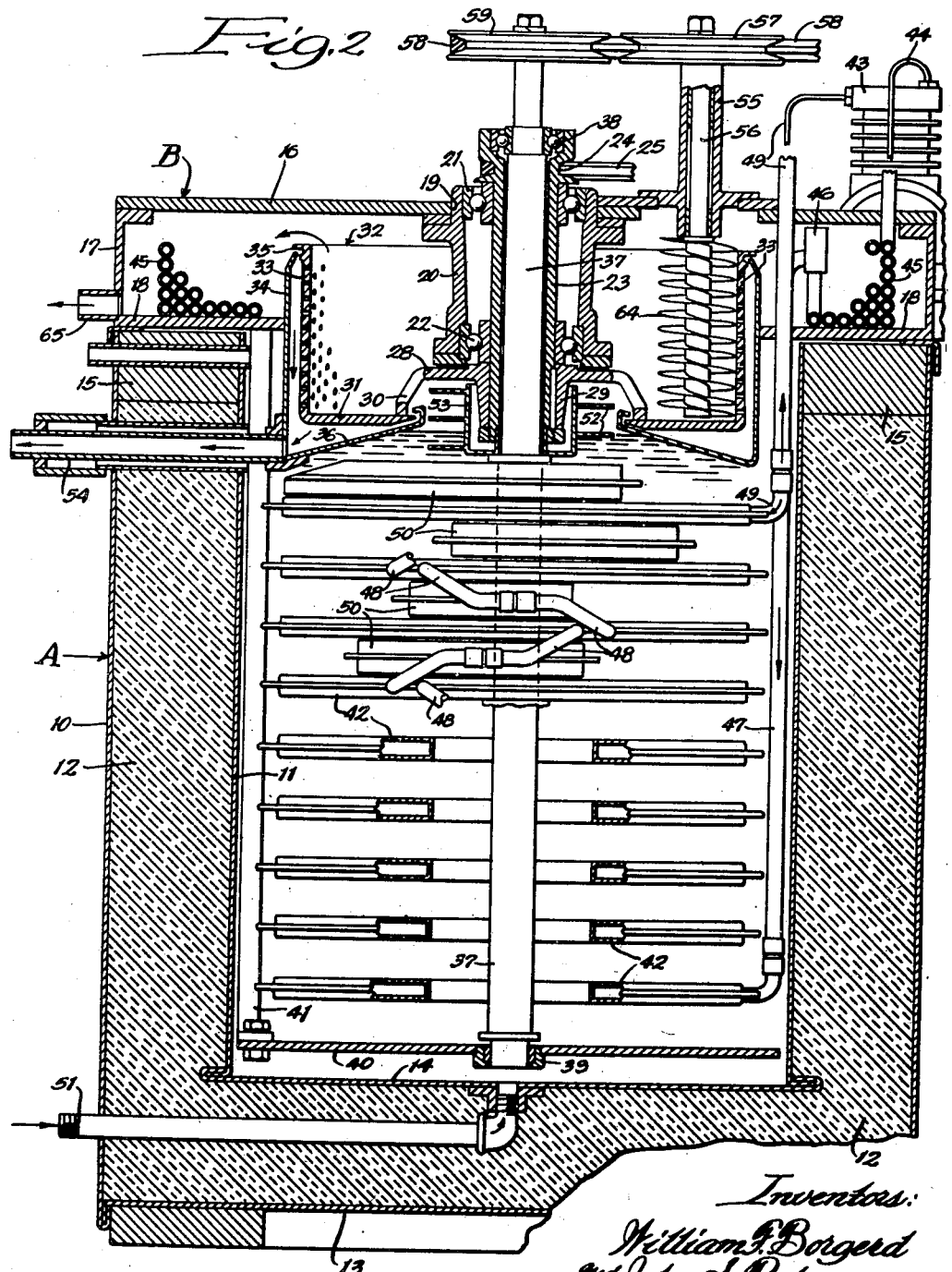

Patented Apr. 29, 1947

2,419,881

UNITED STATES PATENT OFFICE 2,419,881

SEA WATER FRACTIONATOR

William F. Borgerd, Riverside, and John S. Palmer, Chicago, Ill., assignors to International Harvester Company, a corporation of New Jersey Application June 2, 1944, Serial No. 538,430

14 Claims. (Cl. 62—124)

This invention relates to an apparatus for the preparation of potable water through a freezing procedure. The principal feature of the present invention is the preparation of drinking water from sea water by freezing out the water and subsequently melting the water.

A principal object of the invention is to provide a mechanism in which, by a continuous operation, ice crystals are continually formed from a salt water solution. The crystals are strained from the mother liquid and the ice crystals are melted by heat from a refrigerant machine used to supply the necessary low temperature.

Another object is to provide a compact device with a large evaporating surface and simple mechanical means for removing the ice crystals as formed and delivering them to a separating means.

Another object is the provision of a centrifugal type of separating means provided with a conveying means for removing the filtered material continuously as it accumulates in the centrifugal devices.

A particular object is to provide an improved sea water fractionator particularly effective at low temperatures and which may be conveniently operated by any source of electrical current.

Other specific objects and the means by which they are attained will be apparent from the detail description to follow.

In the drawings:

Figure 2 is a section taken on the line 2—2 of Figure 1.

Figure 1:
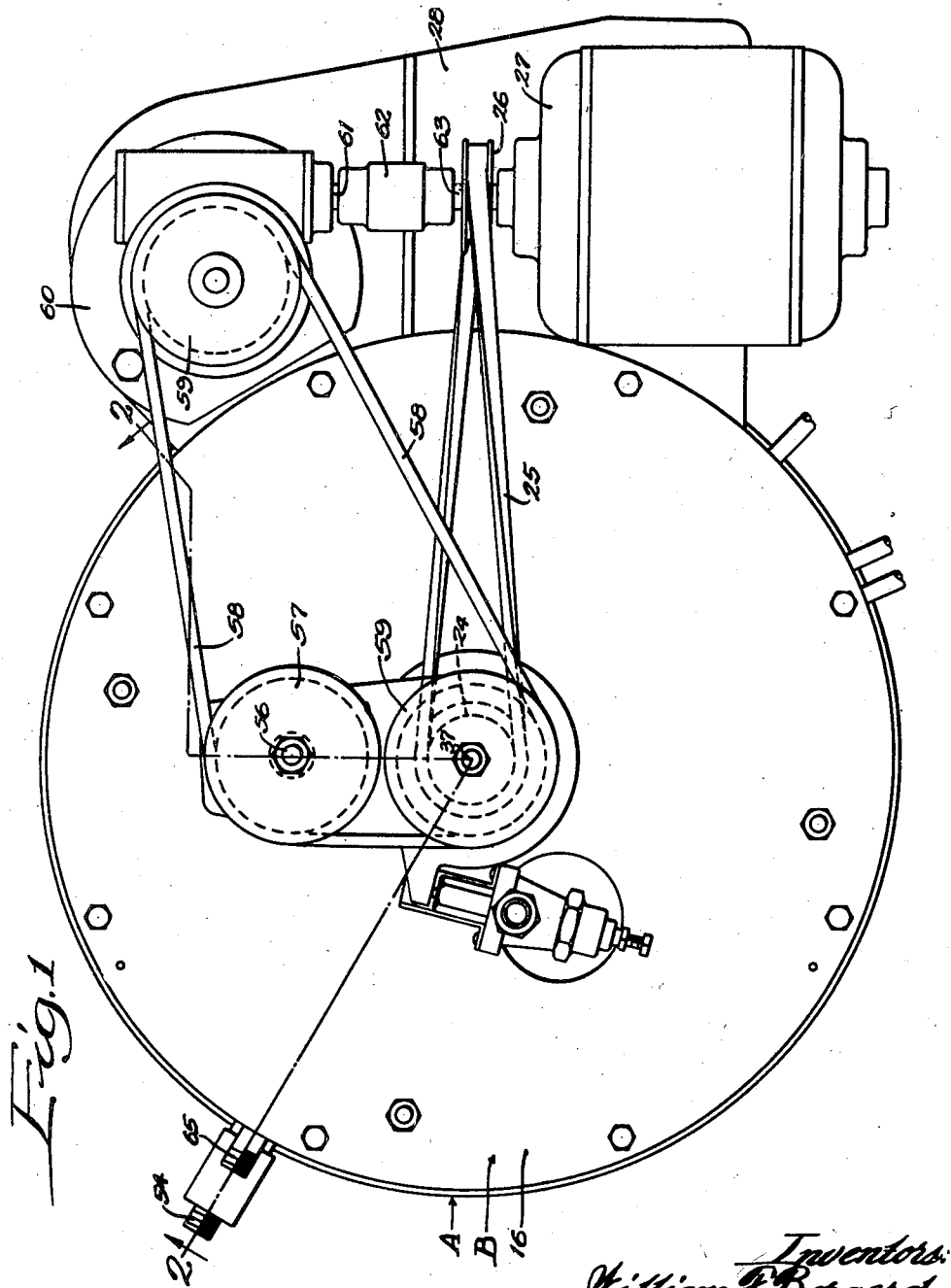
Figure 1 is a plan view of a device incorporating the invention.

Referring to Figure 2, a casing or container A is provided with spaced walls including an outer wall 10 and an inner wall 11, the space between the walls being filled with suitable insulating material 12. Said container is also provided with spaced bottom walls 13 and 14, the insulating material 12 continuing entirely around the container between the bottom walls as well as the cylindrical side walls. At the upper end of the walls 10 and 11, an annular closure 15 is inserted on which a cover assembly B is mounted. Said assembly includes a top plate 16, a cylindrical side wall 17, and an annular bottom wall 18 joining the side wall 17. The bottom wall 18 rests on the top of the container A.

The cover plate 16 is provided with a central opening 19 in which a portion of a supporting member 20 is fitted. Said member carries a ball bearing assembly 21 at the upper end, in the same general plane as the plate 16, and a ball bearing assembly 22 spaced below the bearing assembly 21. Said bearing assemblies rotatably carry a sleeve member 23, said member being provided with a pulley portion 24, around which a V-belt 25 extends. Said belt extends to a pulley 26 on an electrical motor 27, mounted on a bracket 28 at the side of the container A.

At the lower end of the sleeve 23, a supporting member 28 is secured by a hub portion 29 keyed to the sleeve 23 for rotation therewith. Said hub is rigidly secured to the sleeve by a threaded nut. The member 28 has a radial portion and down-turned arms 30 which are suitably secured as by welding to the bottom 31 of a drum structure 32. Said drum structure is opened at its top and has a cylindrical side wall 33 which is formed as a grid, or with a screen or perforated surface which will allow water to escape, but which will retain ice crystals of the size formed in the device.

A cylindrical partition wall 34, secured to annular member 18, extends upwardly, having a bent-over portion terminating adjacent a flange 35 formed around the top of the drum structure 32. At its bottom end, the cylindrical wall 34 is provided with a frustro-conical wall portion 36. Said wall portion extends within an opening formed in the bottom 31 of the drum structure 32. Said bottom is, in fact, an annular member, the arms 30 being secured adjacent the opening which forms the annulus.

A supporting shaft 37 extends downwardly through the sleeve 23 being supported by ball bearing assembly 38 at the top of the sleeve 23 and being journaled in a supporting bearing structure 39 adjacent the bottom wall 14. Said structure is carried by a plate or other suitable means 40 secured to vertically extending members 41. Said members extend upwardly, being secured to the annular bottom 18, whereby the entire structure may be removed as a unit from the container A by disconnecting and removing certain of the conduits.

A plurality of flat annular evaporators 42 are arranged in spaced relation in the container A being secured at their edges to the support of the vertically extending members 41. Said annular evaporators are vertically aligned so that the center openings thereof are aligned vertically. Said evaporators may be formed by any suitable means and are provided with flat faces on opposite sides on which the ice crystals are formed during the operation of the device. Refrigeration for extracting heat from the water being processed may be supplied by any conventional refrigeration machine. A compressor 43 has been illustrated which may be driven by an electric motor or other suitable power means. Said compressor is diagrammatically illustrated as having an outlet 44 for the compressed refrigerant which leads to the condenser 45 consisting of a plurality of coils located in the annular melting chamber formed by the cover plate 16 and the annular bottom plate 18. From the condenser 45 the refrigerant passes to a suitable expansion valve arranged in the line as indicated at 46. From said expansion valve the cooled refrigerant passes through a distribution conduit 47 to the lower evaporator 42 and therefrom through connections 48 between the adjacent evaporators to the upper evaporator. From the upper evaporator the expanded refrigerant passes through a conduit 49 to the inlet side of the compressor 43.

The shaft 37 carries a plurality of scrapers 50, a plurality of which are illustrated. The scrapers 50 are rigidly secured to the shaft 37 for rotation therewith, said scrapers being shaped to remove the ice crystals from the surface of the evaporators 42 and to carry the crystals either to the central portion or to the outer periphery of the evaporators.

Water to be processed, such as sea water, is fed in through a pipe 51, being delivered centrally to the bottom of the container A. The general movement of the water is upwardly, which assists in moving the ice crystals upwardly, said crystals tending to rise to the top due to their specific gravity which is considerably less than the concentrated salt water remaining after the removal of a portion of water by crystallization. The ice crystals rising to the top are engaged by a spiral element 52, carried by a cup-shaped member 53, which is mounted for rotation with the shaft 37. Said spiral element is shaped with respect to the direction of rotation of the shaft 37 to assist in moving the ice crystals along with a certain amount of water into the drum structure 32, the material passing between the arms 30.

As previously explained, the drum structure 30 is continuously rotated at a speed sufficient to throw the material being fed thereto out against the perforate wall 33. The ice crystals are retained, and the concentrated salt water passes through the wall being collected and discharged through an outlet conduit 54.

A bearing structure 55 mounted on an opening in the cover plate 16 carries a shaft 56 adapted to be driven by a pulley 57. Said pulley is engaged by a belt 58 which also engages a drive pulley 59 on the shaft 37. As shown in Figure 1, the belt 58 passes around a drive pulley 59, mounted on a conventional gear reducer 60. Said gear reducer includes a drive shaft 61 which is secured by a coupling 62 with a shaft 63 of the electric motor 27 on which the drive pulley 26 is mounted.

The shaft 56 extends into the drum structure 32 spaced from the wall thereof and carries a spiral conveyor 64, the flights of which operate closely adjacent the interior surface of the perforate wall 33. The flights of said spiral conveyor are driven in such a direction as to continually engage the material on the bottom of the drum structure 32 and to move said material upwardly along the perforate wall 33. By the time the material is built up sufficiently to stay in a position until some of it has reached the flange 35 substantially, all of the water will be drained therefrom. The crystals then will be thrown over the flange 35 into the space in which the coils 45 are located. A heat interchange takes place, whereby the refrigerant is condensed and the ice crystals are melted, the melted potable water being delivered through a conduit 65.

The operation of the water purifying device of the invention has been explained in connection with the description of the container parts thereof. By the arrangement of parts provided, and by operating the mechanisms as set forth, a continuously operable means has been obtained for purifying salt water, such as sea water, and furnishing thereby a continuous supply of drinkable water. The total energy input is comparatively small, as the device is well insulated and as a regenerative heat exchange is used, whereby the minimum amount of heat is lost in the over-all process.

It is to be understood that applicants claim as their invention all devices for treating liquids by refrigeration and crystallization covered by the appended claims.

What is claimed is:

1. A device for fractionating sea water comprising a refrigerant evaporator, means for passing sea water into contact with said evaporator, means for continually removing ice crystals from the surface of the evaporator, a rotating centrifugal device having a perforate wall therein, means for continually delivering the ice crystals along with some of the water being treated to said centrifugal device, said water passing through the perforate wall, and means for moving the ice crystals out of said centrifugal device.

2. A device for fractionating sea water comprising a refrigerant evaporator, means for passing sea water into contact with said evaporator, means for continually removing ice crystals from the surface of the evaporator, a rotating centrifugal device having a perforate wall therein, means for continually delivering the ice crystals along with some of the water being treated to said centrifugal device, said water passing through the perforate wall, and means for moving the ice crystals out of said centrifugal device as they are freed from liquid and delivering the crystals to a receiving means separate from the receiving means for the liquid passing through the perforate wall.

3. A device for fractionating sea water comprising a plurality of vertically spaced horizontally arranged refrigerant evaporators, means for passing sea water into contact with said evaporators, means between the evaporators for continually removing ice crystals from the surfaces thereof, a rotating centrifugal device having a perforate wall therein, means for continually delivering the ice crystals along with some of the water being treated to said centrifugal device, said water passing through the perforate wall, and means for moving the ice crystals out of said centrifugal means.

4. A device for fractionating sea water comprising a plurality of vertically spaced horizontally arranged refrigerant evaporators, means for passing sea water into contact with said evaporators, means between the evaporators for continually removing ice crystals from the surfaces thereof, a rotating centrifugal device having a perforate wall therein, means for continually delivering the ice crystals along with some of the water being treated to said centrifugal device, said water passing through the perforate wall, and means for moving the ice crystals out of said centrifugal means, as they are freed from liquid and delivering the crystals to a receiving means separate from the receiving means for the liquid passing through the perforate wall.

5. A device for fractionating sea water comprising a plurality of vertically spaced refrigerant evaporators having aligned openings therethrough, means for passing sea water into contact with said evaporators, means for continually removing ice crystals from the surface of the evaporators, said means including a vertical shaft extending through said openings and scraper elements projecting therefrom between the evaporators, a separator device having a perforate wall therein, means for continually delivering the ice crystals along with some of the water being treated to said device, said water passing through the perforate wall, and means for continually moving the ice crystals out of said separator device.

6. A device for obtaining potable water from salt solutions, comprising a container, an evaporator mounted therein, a scraper element operating closely adjacent the evaporator whereby ice crystals may be removed therefrom, means for admitting water to be treated to the container, an open top drum structure rotatably mounted on a vertical axis, means for delivering the ice crystals along with a certain amount of solution to the interior of said drum structure, a portion of the vertical wall of said drum structure being perforate whereby the solution escapes therethrough and the crystals accumulate, and means engaging said crystals and moving them upwardly along the perforate wall of the drum structure and over the top thereof, a melting compartment positioned to receive said crystals, and means for removing purified water from said melting compartment.

7. A device for obtaining potable water from salt solutions, comprising a vertical container, a plurality of vertically spaced horizontal evaporators mounted therein, scraper elements operating closely adjacent the evaporators whereby ice crystals may be removed therefrom, means for admitting water to be treated to the container, an open top drum structure rotatably mounted on a vertical axis, means for delivering the ice crystals along with a certain amount of solution to the interior of said drum structure, a vertical wall of said drum structure being perforate whereby the solution escapes therethrough and the crystals accumulate, and means engaging said crystals and moving them upwardly along the perforate wall of the drum structure and over the top thereof, a melting compartment, ice crystals being delivered into said compartment after they pass the top of said wall, and means for removing purified water from said melting compartment.

8. A device for obtaining potable water from salt solutions, comprising a container, an evaporator mounted therein, scraper elements closely adjacent the evaporator whereby ice crystals may be removed therefrom, means for admitting water to be treated to the container, a drum structure rotatably mounted on a vertical axis above said container, said drum structure being open at the top and being provided with an inlet at the central portion of the bottom, means for delivering the ice crystals along with a certain amount of solution through the central inlet to the interior of said drum structure, a wall of said drum structure being perforate whereby the solution escapes therethrough and the crystals accumulate, means acting to move said crystals upwardly and over the top of the drum structure, a melting compartment surrounding the drum structure to receive the ice crystals, and means for removing purified water from said melting compartment.

9. A device for obtaining potable water from salt solutions, comprising an insulated container, an evaporator mounted therein, scraper elements closely adjacent the evaporator whereby ice crystals may be removed therefrom, means for admitting water to be treated to the container, a rotatably mounted drum structure at the top of said container, said container having a restricted central opening at the top thereof, said drum structure having an opening at the bottom in alignment with said opening, conveying means for moving ice crystals collecting by flotation at the top of the container through said openings into the drum structure, a wall of said drum structure being perforate whereby the solution escapes therethrough and the crystals accumulate, and means for removing said crystals from the drum structure.

10. A device for obtaining potable water from salts solutions, comprising an insulated container, a plurality of spaced evaporators mounted therein, said evaporators being arranged horizontally and being of an annular shape with vertically alined openings at the center thereof, a shaft extending through said alined openings, scraper elements mounted on said shaft passing closely adjacent the evaporators, whereby ice crystals may be removed therefrom, means for admitting water to be treated to the container, said crystals collecting by flotation at the top, an open top drum structure rotatably mounted at the top of said container, conveying means for delivering the ice crystals along with a certain amount of solution to the interior of said drum structure, the outer vertical wall of said drum structure being perforate whereby the solution escapes therethrough and the crystals accumulate, and means for removing the crystals from the drum structure.

11. A device for obtaining potable water from salt solutions, comprising an insulated container, a plurality of spaced evaporators mounted therein, said evaporators being arranged horizontally and being of an annular shape with vertically alined openings at the center thereof, a shaft extending through said alined openings, scraper elements mounted on said shaft passing closely adjacent the evaporators, whereby ice crystals may be removed therefrom, means for admitting water to be treated to the container, said crystals collecting by flotation at the top, an open top drum structure rotatably mounted at the top of said container, conveying means for delivering the ice crystals along with a certain amount of solution to the interior of said drum structure, the outer vertical wall of said drum structure being perforate whereby the solution escapes therethrough and the crystals accumulate, means including an auger mounted on a vertical axis for engaging said crystals and moving them gradually upwardly along the perforate wall of the drum structure, a melting compartment at the top of the container adjacent the drum structure, ice crystals being delivered into said compartment after they pass the top of the vertical wall of the drum structure, and means for removing purified water from said melting compartment.

12. A device for obtaining potable water from salt solutions, comprising an insulated container, a plurality of spaced evaporators mounted therein, said evaporators being arranged horizontally and being of an annular shape with vertically alined openings at the center thereof, a shaft extending through said alined openings, scraper elements mounted on said shaft passing closely adjacent the evaporators, whereby ice crystals may be removed therefrom, means for admitting water to be treated to the container, said crystals collecting by flotation at the top, an open top drum structure rotatably mounted at the top of said container, conveying means for delivering the ice crystals along with a certain amount of solution to the interior of said drum structure, the outer vertical wall of said drum structure being perforate whereby the solution escapes therethrough and the crystals accumulate, means including an auger mounted on a vertical axis for engaging said crystals and moving them gradually upwardly along the perforate wall of the drum structure, a melting compartment at the top of the container adjacent said drum structure, ice crystals being delivered into said compartment after they pass the top of the vertical wall of the drum structure, means for removing purified water from said melting compartment, a refrigerant compressor, conduit heat exchange means for conducting hot compressed refrigerant through said melting compartment, and means for delivering the condensed refrigerant to the evaporators.

13. A device for obtaining potable water from salt solutions, comprising an insulated container, a plurality of spaced evaporators mounted therein, said evaporators being arranged horizontally and being of an annular shape with vertically alined openings at the center thereof, a shaft extending through said alined openings, scraper elements mounted on said shaft passing closely adjacent the evaporators, whereby ice crystals may be removed therefrom, means for admitting water to be treated to the container, an open top drum structure rotatably mounted at the top of said container, means for delivering the ice crystals along with a certain amount of solution to the interior of said drum structure, the outer vertical wall of said drum structure being perforate whereby the solution escapes therethrough and the crystals accumulate, means for engaging said crystals and moving them upwardly along the perforate wall and over the top of the drum structure, a melting compartment adjacent the drum structure, the ice crystals being discharged into said compartment, and means for removing purified water from said melting compartment.

14. A device for obtaining potable water from salt solutions, comprising an insulated container, a plurality of spaced evaporators mounted therein, said evaporators being arranged horizontally and being of an annular shape with vertically alined openings at the center thereof, a shaft extending through said alined openings, scraper elements mounted on said shaft passing closely adjacent the evaporators, whereby ice crystals may be removed therefrom, means for admitting water to be treated to the container, an open top drum structure rotatably mounted at the top of said container, means for delivering the ice crystals along with a certain amount of solution to the interior of said drum structure, the outer vertical wall of said drum structure being perforate whereby the solution escapes therethrough and the crystals accumulate, means for engaging said crystals and moving them upwardly along the perforate wall and over the top of the drum structure, a melting compartment adjacent the drum structure, the ice crystals being discharged into said compartment, means for removing purified water from said melting compartment, a refrigerant compressor, means for delivering hot compressed refrigerant through said melting compartment, and means for delivering the condensed refrigerant to the evaporators.

WILLIAM F. BORGERD.
JOHN S. PALMER.

REFERENCES CITED

The following references are of record in the file of this patent:

UNITED STATES PATENTS

| Number | Name | Date |
|--------|------|------|
| 2,337,317 | Eggert | Dec. 21, 1943 |
| 1,641,429 | Heyman, et al. | Sept. 6, 1927 |
| 1,931,347 | Gay | Oct. 17, 1933 |
| 2,315,762 | Ax, et al. | Apr. 6, 1943 |